(12) United States Patent
Habegger

(10) Patent No.: US 7,857,387 B2
(45) Date of Patent: Dec. 28, 2010

(54) PNEUMATIC LORDOSIS SUPPORT

(75) Inventor: Daniel Habegger, Zurich (CH)

(73) Assignee: Prospective Concepts AG, Glattbrugg (CH)

( * ) Notice: Subject to any disclaimer, the term of this patent is extended or adjusted under 35 U.S.C. 154(b) by 212 days.

(21) Appl. No.: 11/667,805

(22) PCT Filed: Oct. 31, 2005

(86) PCT No.: PCT/CH2005/000635

§ 371 (c)(1),
(2), (4) Date: Apr. 10, 2008

(87) PCT Pub. No.: WO2006/053453

PCT Pub. Date: May 26, 2006

(65) Prior Publication Data

US 2008/0315650 A1    Dec. 25, 2008

(30) Foreign Application Priority Data

Nov. 17, 2004   (CH) .................................... 1892/04

(51) Int. Cl.
*A47C 4/54* (2006.01)
(52) U.S. Cl. .............. 297/284.6; 297/284.1; 297/284.3; 297/284.9
(58) Field of Classification Search .............. 297/284.1, 297/284.3, 284.6, 284.9
See application file for complete search history.

(56) References Cited

U.S. PATENT DOCUMENTS

| | | | | | |
|---|---|---|---|---|---|
| 3,112,956 | A | * | 12/1963 | Schick et al. ............ | 297/219.1 |
| 3,145,054 | A | * | 8/1964 | Sopko, Jr ................. | 297/452.3 |
| 3,276,047 | A | * | 10/1966 | Emery ......................... | 5/654 |
| 3,540,776 | A | * | 11/1970 | Wilson ...................... | 297/253 |
| 4,619,481 | A | * | 10/1986 | Grudzinskas ............ | 297/284.1 |
| 4,759,543 | A | * | 7/1988 | Feldman ..................... | 482/148 |
| 4,793,651 | A | * | 12/1988 | Inagaki et al. .......... | 297/180.11 |
| 4,965,899 | A | * | 10/1990 | Sekido et al. ............ | 297/284.6 |
| 5,713,631 | A | * | 2/1998 | O'Neill et al. ........... | 297/284.6 |
| 5,826,937 | A | * | 10/1998 | Massara ................... | 297/284.6 |
| 6,206,474 | B1 | * | 3/2001 | Kruse et al. ............. | 297/452.41 |
| 6,551,450 | B1 | * | 4/2003 | Thomas et al. ........... | 156/580.1 |
| 6,578,916 | B2 | * | 6/2003 | Longhi et al. ............ | 297/284.3 |
| 6,823,549 | B1 | * | 11/2004 | Hampton et al. ................ | 5/713 |

FOREIGN PATENT DOCUMENTS

DE       3334864 A1 *  4/1985

(Continued)

*Primary Examiner*—Laurie K Cranmer
(74) *Attorney, Agent, or Firm*—Winstead PC

(57) ABSTRACT

A pneumatic lordosis support (1) consists of a cushion (3), which is integrated into the backrest (2) of a seat. Laterally of a vertical center line (7), the cushion encompasses horizontal connections (8) between a front side and a rear side of the cushion (3). The cushion (3) is composed of an air-tight flexible membrane. In the region of the vertical center line (7), the connections (8) encompass breaks. Vertically offset to the connections (8), the cushion (3) encompasses further central horizontal connections (10), which extend substantially across the region of the breaks in the connection (8). In the region where connections (8) and central connections (10) are located close to one another, reduced radii of the membrane lead to the occurrence of less stress than in the remaining cushions (3) and allow the spine of a user to dip into the cushion (3) more softly.

12 Claims, 3 Drawing Sheets

FOREIGN PATENT DOCUMENTS

| | | |
|---|---|---|
| DE | 102 32 625 | 1/2004 |
| EP | 1 044 669 | 10/2000 |
| FR | 2557441 A1 * | 7/1985 |
| WO | WO-98/58566 | 12/1998 |
| WO | WO-01/40012 | 6/2001 |

* cited by examiner

Fig. 5
Fig. 6
Fig. 7
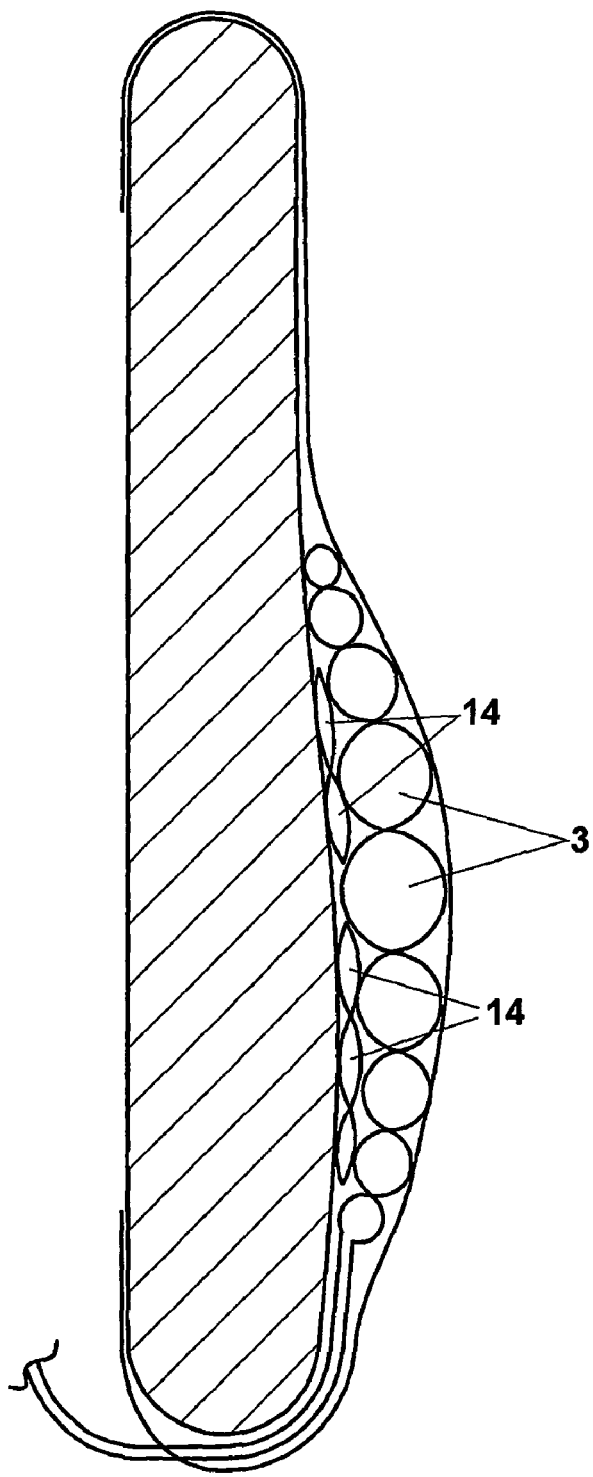
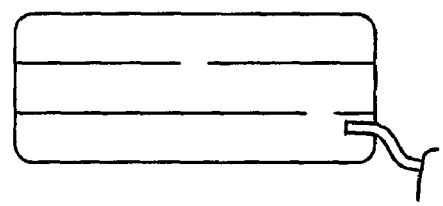
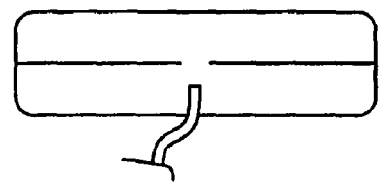

PNEUMATIC LORDOSIS SUPPORT

The instant invention relates to a pneumatic lordosis support, for example for use in vehicle seats according to the preamble of patent claim 1. Pneumatic lordosis supports are inherently known. Generally, they consist of one or a plurality of air cushions, which are integrated into a backrest or into a lying surface in the lumbar region. An example for a pneumatic lordosis support is disclosed in WO 98/58566. This lordosis support is composed of three cushions, with the incline of the primary cushion being capable of being changed by means of two smaller secondary cushions, which are installed below a larger primary cushion. The adaptability, however, is very limited. When pressurized, the primary cushion aims at a spherical shape, which is ergonomically suboptimal.

One problem of pneumatic lordosis supports may be that they are too hard in the region of the spine and can thus cause pressure marks, depending on the anatomy of the user.

It is the object of the instant invention to create a pneumatic lordosis support, which enables a good ergonomic support of the lumbar region, which is capably of satisfying high demands with reference to the comfort and ergonomics, which does not lead to pressure marks, in particular in the region of the spine, and the support function of which can easily and rapidly be adapted to individual requirements of various users. Furthermore, it is to be possible to produce the lordosis support in a cost-efficient and simple manner.

The solution of the object is represented in patent claim 1 in view of the essential features and in the further patent claims in view of further advantageous features. The invention will be explained in more detail by means of the accompanying drawings.

Figure 1:
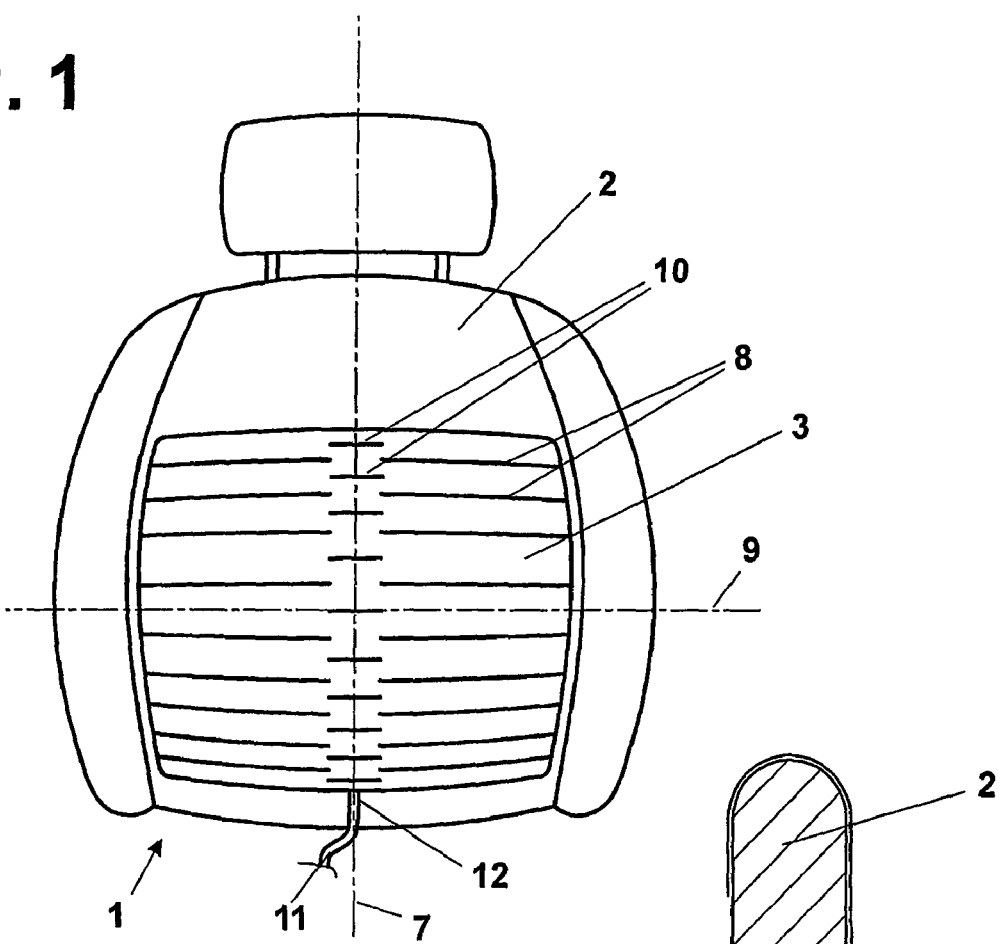
Figure 2:
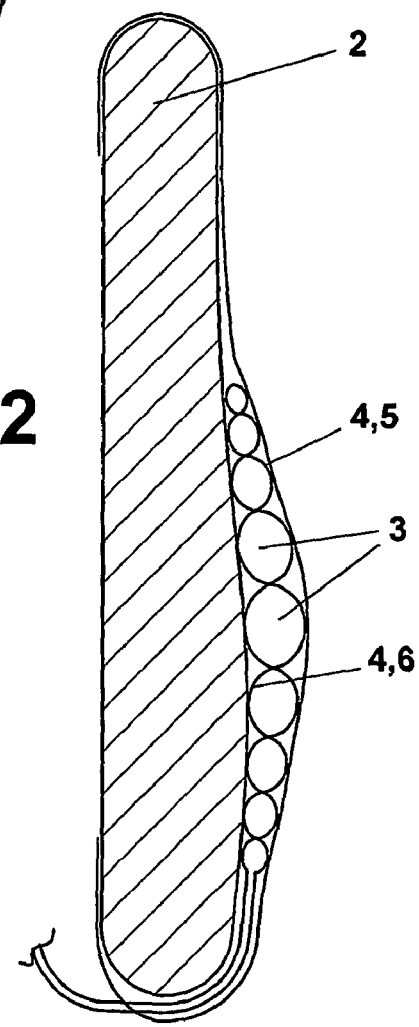
Figure 3:
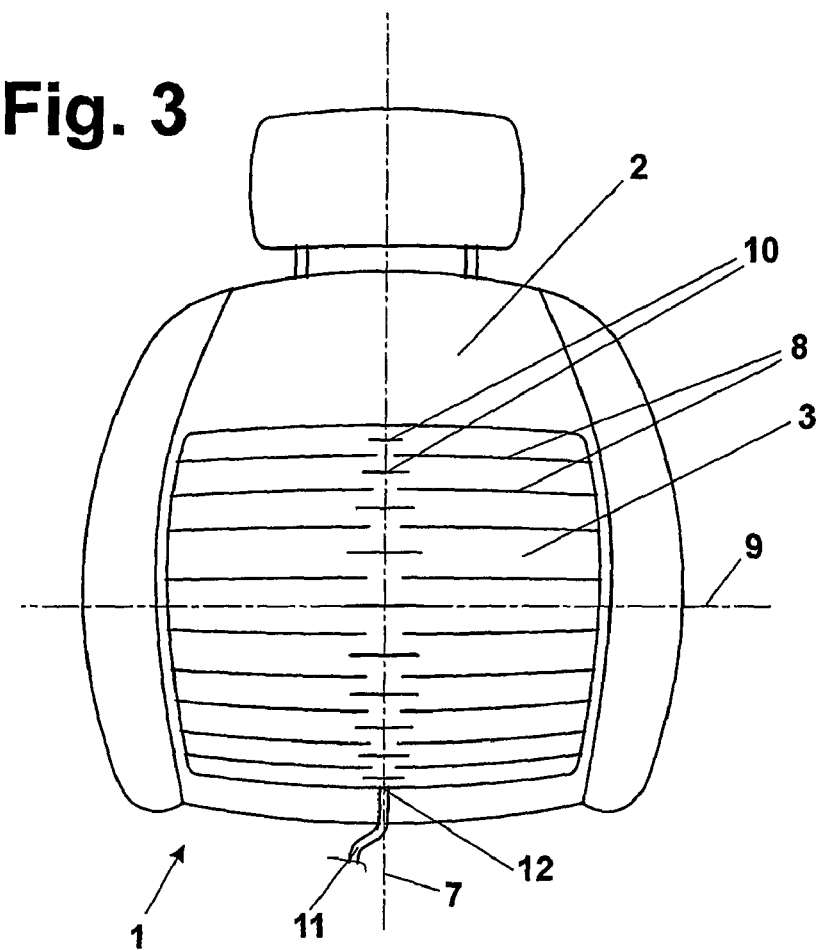
Figure 4:
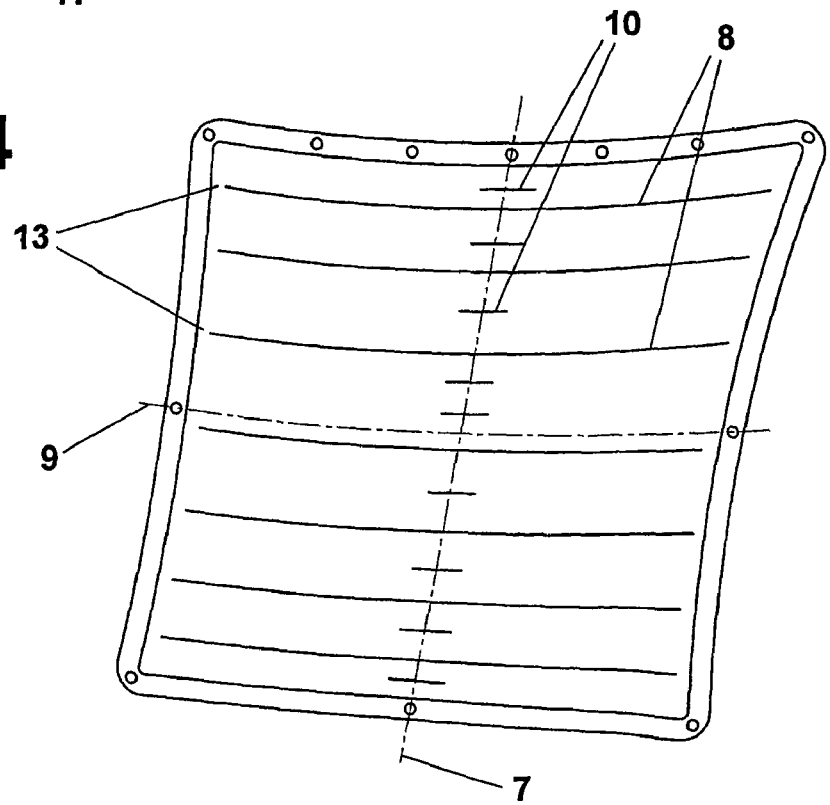

FIG. 1 shows a schematic illustration of a first exemplary embodiment of a lordosis support in top view, FIG. 2 shows a schematic illustration of the first exemplary embodiment of a lordosis support in cross-section, FIG. 3 shows a schematic illustration of a second exemplary embodiment of a lordosis support in top view, FIG. 4 shows a schematic illustration of a third exemplary embodiment of a lordosis support in top view, FIG. 5 shows a schematic illustration of a fourth exemplary embodiment of a lordosis support in cross-section, FIG. 6 shows a schematic illustration of a first exemplary embodiment of an auxiliary cushion in top view, FIG. 7 shows a schematic illustration of a second exemplary embodiment of an auxiliary cushion in top view.

FIGS. 1 and 2 schematically illustrate a first exemplary embodiment of a pneumatic lordosis support 1. The lordosis support 1 is integrated into a backrest 2 of a seat. The lordosis support 1 is composed of an air-tight cushion 3, made of an air-tight flexible membrane 4, which rests on the backrest 2 in the lumbar region and which is fastened to the backrest 2 by means of fastening means in such a manner that the cushion 3 does not shift. The cushion 3 has a front side 5 facing the back of the user and a rear side 6, which faces the backrest 2 of the seat.

A lordosis support 1 is in relationship with the body of the user. For better comprehensibility of the description, "vertical" will be used in the following as a synonym for "parallel to the direction of the spine of the user", even if, strictly speaking, this is only correct with a perpendicular backrest 2. A lordosis support 1, however, can also be used in a lying or semi-lying position. Accordingly, "horizontal" will be used as a synonym for "the direction of the shoulder line of the user". If not mentioned otherwise, vertical and horizontal thus relate to the local coordinate system of the user.

On both sides of a vertical center line 7, the cushion 3 encompasses a plurality, substantially horizontal, linear connections 8 of the front side 5 and of the rear side 6 of the cushion 3. These connections 8 are not continuous across the entire width of the cushion 3, but encompass a break in the region of the center line 7. With a cushion 3, the connections 8 can be made of a plastic foil by means of gluing or fusing, for example.

The vertical distance of the connections 8 determines the radii of the horizontally located tube ends defined by connections 8 and membrane 4 and thus the thickness and the vertical cross-section of the lordosis support 1 in the event of pressurization. It can be seen from FIG. 2 that an ergonomic shape of the lordosis support 1 can be achieved by means of different distances between the connections 8. For example, the vertical distance between the horizontal connections 8 from the horizontal center line 9 of the cushion 3 continuously decreases towards the upper as well as the lower edge of the cushion 3. In the region of the vertical center line 7, the cushion 3 encompasses central connections 10, which are also substantially horizontal. However, these connections are vertically offset with regard to the lateral connections 8. This configuration of the connections 8, 10 creates a surprisingly comfortable and ergonomic effect. In the region of the vertical center line 7, the cushion 3 acts as if the distance between the connections 8, 10 were halved because the lateral connections 8 as well as the central connections 10 influence the stress ratios in the membrane 4. The stress in a pressurized membrane 4 is proportional to the overpressure as well as to the radius of the membrane 4. In the region of the vertical center line 7 and specifically in the region of the two vertical lines where lateral connections 8 and central connections 10 abut one another in a vertically offset manner, the tension in the membrane 4 is thus reduced. At that location, the cushion 3 is thus softer and protruding parts of the spine dip lightly and softly into the lordosis support 1, while laterally thereof the back is supported more firmly and harder in the region of the back muscles. The compressed air supply via a line 11 occurs via a valve 12 installed in the lower region of the cushion. In principle, the valve 12 can be installed at any location of the cushion 3. The optimal location results from the wiring to the compressed air supply. For safety reasons, a safety valve can be installed on the cushion 3 or in the line 11. Said safety valve opens in the event of a defined overpressure so as to prevent the cushion 3 from bursting due to overstressing. A predetermined breaking point included in the membrane 4, which rips if a critical overpressure is exceeded and thus leads to a controlled membrane break, can be an advantageous alternative for a safety valve. Depending on the support requirement, a pressure can be supplied to the lordosis support 1 to a greater or lesser extent. The control and regulating device, operating unit and compressed air generation unit required for this purpose are not discussed herein in detail. The person of skill in the art is familiar with such systems in embodiments of very different kinds and they are thus state of the art.

FIG. 3 shows a second exemplary embodiment of a lordosis support 1 as claimed in the invention. In the region of the vertical center line 7, the lateral connections 8 and the central horizontal connections 10 overlap. The tension of the membrane 4, as compared to the other regions of the cushion 3, is thus additionally decreased and the cushion 3 becomes softer at that location. Furthermore, the length of the central connections 10 as well as the length of the breaks of the lateral connections 8 can be chosen to be different. According to the invention, a plurality or even not a single central connection 10 is to be installed between two lateral connections 8.

FIG. 4 illustrates a third exemplary embodiment. The lateral connections 8 are combined to a continuous horizontal connection 8. To allow the pressure build-up in the entire cushion 3, at least one break is required in each connection 8 for the air exchange between the compartments of the cushion 3, which are separated by the connections 8. In this exemplary embodiment, air passages 13 are disposed on both edges of the cushion 3. One or a plurality of air passages 13 can be disposed at arbitrary locations of the connection 8. In the region of the vertical center line 7, central connections 10 with the above-described function are available, in turn.

FIG. 5 shows a fourth exemplary embodiment of a pneumatic lordosis support 1 in a side view. Two auxiliary cushions 14 comprising separate air supply are installed between a cushion 3 according to the first three exemplary embodiments and the backrest 2. In the event of the supply of compressed air, the upper auxiliary cushion 14 enables a displacement of the biggest bulge of the lordosis support 1 upwards and thus allows for an ergonomic adaptation, for example for very tall users. Analogously, the lower auxiliary cushion 14 allows for an adaptation, for example for very short users. Cushion 3 and auxiliary cushion 14 can be pressurized and released independent on one another. By means of two or more auxiliary cushions 14, this makes it possible to generate a massage effect below the cushion 3 in that the auxiliary cushions 14 are pressurized, for example from bottom to top or from top to bottom in turn and are subsequently released again. This creates a massaging wave movement moving upwards or downwards at the front side 5 of the lordosis support 1. Further stimulating, relaxing, calming and loosening movement patterns can be stored as programs in the control unit and can be accessed by the user. The pressure supply and release can be programmed in a rhythmic or stochastic, rapid or slow sequence, depending on the desired effect. The idea of the invention also includes, for example, a function to maintain an awake state, which, during long night time drives, for example, briefly shifts the lordosis support 1 in a stochastic manner and thus counteracts the monotony of an autobahn drive.

FIGS. 6 and 7 show two possible forms of such auxiliary cushions 14. Generally, it also corresponds to the invention to design such auxiliary cushions 14 without horizontal connections 8 as simple cost-efficient tubes. On the other hand, the auxiliary cushions can also be designed in the same way as the cushion 3.

The production of a cushion 3 as illustrated in FIG. 4 can be carried out in a simple, efficient and cost-efficient manner, in that an upper and a lower plastic foil are fused together by means of a die in the shape of the desired connections 8, 10, for example. The two plastic foils form the front side 5 and the rear side 6 of the cushion 3. The valve 12 can be installed in a second step. The fastening means, for example eyelets, can be installed at the edge of the cushion 3. The auxiliary cushions 14 can, for example, also be installed by means of said fastening means at the edge of the cushion 3. A further embodiment of a cushion 3 according to the invention can be created in that a division of the cushion 3 into a plurality of partial cushions comprising different pressures is carried out. For example, the cushion 3 is horizontally divided into two partial cushions by means of a break-free connection 8. The additional expenses for the production of the cushion 3 are limited to the installation of one or a plurality of additional valves, which enable a separate supply of compressed air to the partial cushions. The division into a plurality of partial cushions can also occur in vertical direction. The additional cushions 14 can also be divided into a plurality of partial cushions.

All of the combinations of the features disclosed in the above exemplary embodiments, which are to be carried out by the person of skill in the art, are included in the idea of the invention.

The invention claimed is:

1. A pneumatic lordosis support comprising:
at least one pressurized cushion, the at least one pressurized cushion comprising a front membrane and a rear membrane;
a medial strip disposed on a center line of the at least one pressurized cushion and oriented to be substantially parallel to a spine of a user;
at least one uncontinuous first seam connecting the front membrane with the rear membrane, said at least one uncontinuous first seam operable to subdivide the at least one pressurized cushion into compartments, the compartments having a length and a width, the length extending transverse to the medial strip over a width of the at least one pressurized cushion, the at least one uncontinuous first seam oriented transverse to the medial strip and extending into a lateral portion of the at least one pressurized cushion;
a plurality of central seams connecting the front membrane with the rear membrane, said plurality of central seams disposed proximate to the medial strip and offset in a direction of the medial strip relative to the at least one uncontinuous first seam; and
wherein the plurality of central seams being shorter than half the width of the at least one pressurized cushion.

2. The pneumatic lordosis support according to claim 1, wherein:
the at least one uncontinuous first seam comprises a break in a region of the medial strip; and
a length of the plurality of central seams substantially corresponds to a length of the break in the at least one uncontinuous first seam.

3. The pneumatic lordosis support according to claim 1, wherein the at least one uncontinuous first seam runs continuously through the medial strip and leaves open air passages on both sides of the at least one pressurized cushion.

4. The pneumatic lordosis support according to claim 1, wherein at least one compartment formed by and between two of the at least one uncontinuous first seams encompasses more than one of the plurality of central seams located in the medial strip.

5. The pneumatic lordosis support according to claim 1, wherein:
a distance between the at least one uncontinuous first seam decreases from a compartment comprising the greatest distance between the at least one uncontinuous first seams in the direction of the medial strip towards an upper and a lower edge of the at least one pressurized cushion; and
a thickness of the pressurized cushion decreases towards the upper and the lower edge.

6. The pneumatic lordosis support according to claim 1 comprising:
at least one auxiliary cushion disposed on a rear side of the at least one pressurized cushion;
the at least one auxiliary cushion comprising an air supply independent from the at least one pressurized cushion thus enabling the at least one auxiliary cushion to encompass a pressure different from a pressure of the at least one pressurized cushion.

7. The pneumatic lordosis support according to claim 6, comprising:

at least two auxiliary cushions, disposed on the rear side of the at least one pressurized cushion;

the at least two auxiliary cushions operable to be pressurized independent from one another; and, a control operable to pressurize and release the at least two auxiliary cushions independent from one another so as to bring about a massage effect for the user.

8. The pneumatic lordosis support according to claim 7, wherein the at least one pressurized cushion and at least one of the at least two auxiliary cushions are each divided into at least two air-tight partial cushions, the at least two air-tight partial cushions being supplied with compressed air independent from one another thereby allowing the at least two air-tight partial cushions to have different pressures.

9. The pneumatic lordosis support according to claim 8, comprising a control operable to pressurize and release the at least two partial cushions independent from one another so as to bring about a massage effect for the user.

10. The pneumatic lordosis support according to claim 1, wherein the at least one pressurized cushion comprises two plastic foils, which are fused by means of dies disposed in the at least one uncontinuous first seams.

11. The pneumatic lordosis support according to claim 1, comprising fasteners disposed at an edge of the at least one pressurized cushion, the fasteners operable to allow positioning of the at least one pressurized cushion.

12. The pneumatic lordosis support according to claim 1 comprising:

connectors operable to supply and lead away compressed air;

an operating and control unit; and an air compressor.

* * * * *